United States Patent
Gao et al.

(10) Patent No.: US 6,944,827 B2
(45) Date of Patent: Sep. 13, 2005

(54) SYSTEM AND METHOD OF DATA TRANSMISSION FOR COMPUTER NETWORKS UTILIZING HTTP

(75) Inventors: Yang Gao, Fremont, CA (US); Zheng John Shi, San Francisco, CA (US); Shun Gao, San Jose, CA (US); Armeen Mazda, Tiburon, CA (US)

(73) Assignee: Appeon Corporation, Hong Kong (HK)

(*) Notice: Subject to any disclaimer, the term of this patent is extended or adjusted under 35 U.S.C. 154(b) by 567 days.

(21) Appl. No.: 09/916,251

(22) Filed: Jul. 30, 2001

(65) Prior Publication Data

US 2003/0067480 A1 Apr. 10, 2003

Related U.S. Application Data

(60) Provisional application No. 60/231,842, filed on Sep. 11, 2000.

(51) Int. Cl.[7] .................................................. G09G 5/00
(52) U.S. Cl. ........................ 715/738; 715/740; 709/227
(58) Field of Search ................................. 715/733, 760, 715/749, 738–740; 719/330, 315, 328; 709/203, 227; 345/733, 738, 740, 749, 760

(56) References Cited

U.S. PATENT DOCUMENTS

| | | | | |
|---|---|---|---|---|
| 6,249,822 B1 | * | 6/2001 | Kays et al. | 719/330 |
| 6,393,497 B1 | * | 5/2002 | Arnold et al. | 719/330 |
| 6,523,063 B1 | * | 2/2003 | Miller et al. | 709/206 |
| 6,654,793 B1 | * | 11/2003 | Wollrath et al. | 709/217 |
| 6,708,223 B1 | * | 3/2004 | Wang et al. | 709/315 |
| 2002/0042830 A1 | * | 4/2002 | Bose et al. | 709/230 |
| 2003/0009562 A1 | * | 1/2003 | Heymann et al. | 709/227 |

OTHER PUBLICATIONS

Rmb2Html 2.00 Help System, Using the IFRAME feature of Microsoft Internet Explorer, Sep. 10, 1999.*
William Wen, "Creating Lightweight Web Pages," Interactive Developer, Sep. 1999.*
Implementing HTML Frames, W3C Working Draft Mar. 31, 1997.*
LiveWire and Active Server Pages (APS), Jan. 10, 1997.*

* cited by examiner

*Primary Examiner*—John Cabeca
*Assistant Examiner*—Tadesse Hailu
(74) *Attorney, Agent, or Firm*—Patterson, Thuente, Skaar & Christensen, P.A.

(57) ABSTRACT

The present invention permits textual data to be exchanged between a Web page displayed in a standard Microsoft Web browser window and a server, utilizing a non-persistent HTTP connection. Traditionally, each time textual data is received to the displayed Web page a record is added to the history list. This is problematic as it clutters the history list, compromises the functionality of the browser "Back" and "Forward" buttons, and results in undesirable server operations to be executed. The present invention utilizes several methods for loading textual data to a displayed Web page, without adding a URL to the history list. In one aspect of the invention, a <xml> element is used to transmit a HTTP request for new data and receive the HTTP response. The present invention can be used to build a lightweight Web page that offers real-time data and interactivity.

9 Claims, 1 Drawing Sheet

SYSTEM AND METHOD OF DATA TRANSMISSION FOR COMPUTER NETWORKS UTILIZING HTTP

CROSS-REFERENCE TO RELATED APPLICATIONS

This application claims the benefit of U.S. Provisional Application No. 60/231,842 filed Sept. 11, 2000.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

The present invention relates generally to transmitting information over computer networks, and more particularly, to a system and method of transmitting data from a server to a Web page displayed in a Web browser.

2. Description of the Related Art

The Internet is a computer network that provides access to the World Wide Web ("the Web"); a vast collection of pages comprised of text, hyperlinks, graphical elements, input elements (e.g. HTML text box), and program code (e.g. JavaScript). Graphical user interface programs called Web browsers are employed by Internet users to receive, or download, the Web pages from servers and display the pages at their client devices. A Web browser displays Web pages by interpreting the HTML document and executing any program code, which results in the showing text, hyperlinks, graphical elements, and input elements on a client display screen.

The rapid increase in the number of Internet users and the ubiquity of the Web browser have prompted companies to adopt Web pages for delivering, to end-users, time-sensitive information and mission-critical software applications. These Web-based applications generally require numerous transmissions of data between a server and the Web browser. Traditionally, for each transmission of data, a new page must be transmitted back to the user or their existing page must be refreshed. This traditional data transmission model, when used in the context of delivering web-based applications to end-users, greatly increases the number of redundant Web page refreshes. Web page refreshes are problematic, because they result in unnecessary server and bandwidth utilization, and force the user to wait for redundant pages to load. This negatively impacts the Web-based application's effectiveness and the Internet user's productivity, while compromising network efficiency and scalability.

Several developments illustrate the great effort at reducing redundant page refreshes and for providing a rich interactive user experience for Web pages without utilizing Web browser plug-ins, such as Macromedia's Flash player or Microsoft's ActiveX controls. One of which was developed and promoted by Microsoft.

Microsoft developed a Java Applet-based technology called "Remote Scripting", which allows information to be exchanged between a displayed Web page and the server, without having to refresh the page. After several years of promotion by Microsoft, however, "Remote Scripting" technology has not been widely adopted by Web developers. There are several reasons for this:

1. Slow: In order to use "Remote Scripting," each Web page must include a Java Applet, acting as the client-side communication proxy, which must initialize Java Virtual Machine at the client's computer. Initialization of Java Virtual Machine and loading of the Java Applet is a slow process that introduces an undesirable delay in displaying the Web page for most personal computers.

2. Limited Server Compatibility: "Remote Scripting" only supports Microsoft Web server software, such as Microsoft's IIS (Internet Information Server). Most high traffic and established commercial Websites, however, use a non-Microsoft platform or wish not to be limited to only using the Microsoft platform in the future.

As a result of these serious limitations, most Web-based applications do not or cannot take advantage of Microsoft's "Remote Scripting" technology.

Consequently, the most common method for achieving real-time Web page interactivity today, without Web browser plug-ins, is by using a <iframe> element. The <iframe> element serves as the communication proxy for the Web browser. Data is transmitted to the server by utilizing a <form> element and either the "post" or "get" method. Alternatively, one could transmit data to a Web page without utilizing the <form> element by dynamically changing the "src" attribute of an <iframe> element at the Web browser. The <iframe> method for data transmission overcomes the limitations of Microsoft's "Remote Scripting," but introduces one new serious limitation, which greatly compromises the operation of Microsoft's Web browser.

Specifically, each time new information is loaded into an <iframe> element, a record or URL (Universal Resource Locator) is added to the Microsoft Web browser's history list. That is, the browser is now adding every action performed from the Web page to the history list, rather than just each unique Web page. Thus, since each unique Web page may make several data transmissions, several history records are now being associated with each unique Web page. This is problematic in the context of Web-based applications for the following reasons:

1. Clutters the history list: users must navigate through a large directory tree full of redundant entries before finding the desired Web page.
2. Compromises Web page navigation: users must repeatedly click on the "Back" or "Forward" buttons before being able to leave the current Web page.
3. Produces undesirable application operations: users will trigger duplicate operations at the server (e.g. charge my credit card) when navigating with the browser's "Back" and "Forward" buttons.

These problems affect many Internet users today as the majority of these users utilize a Microsoft Web browser. Furthermore, as Netscape winds down its Web browser business and Microsoft becomes the de facto Web browser, this problem will soon plague every single Internet user, and thus cannot be ignored.

From the discussion above, it should be apparent that there is a need for better method of transmitting data from a server to a displayed Web page over HTTP. Specifically, a method that offers at least the same benefits of the <iframe> method, without disrupting the Microsoft Web browser's history list. The present invention fulfills this need.

BRIEF SUMMARY OF THE INVENTION

The present invention permits the downloading of new information to a Web page within a Microsoft Web browser through a non-persistent HTTP connection, and without utilizing Web browser plug-in, Java Applet, or ActiveX technology. Furthermore, the present invention accomplishes the downloading action to the Web page without adding a record or URL to the Web browser's history list.

Other features and advantages of the present invention should be apparent and will be better understood by reference to the drawings and the following detailed description, which illustrate, by way of example, the principles of the invention.

DETAILED DESCRIPTION OF THE INVENTION

Figure 1:
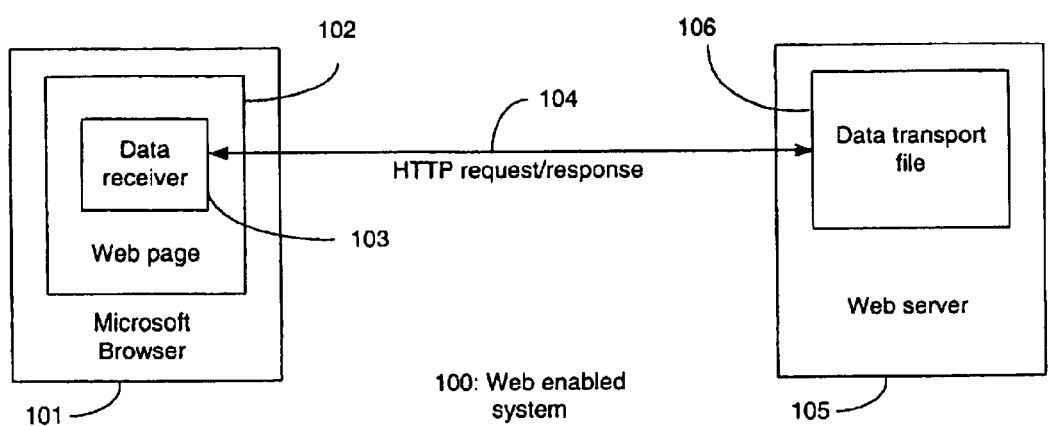
FIG. 1 shows a system having Web pages on client computers and Web server constructed in accordance with the present invention.

Generally speaking, new data is transmitted from a server to a Web page within a Web browser over a non-persistent or persistent connection, either by utilizing browser-native or non-browser-native client-side technology. A non-persistent connection is established through the standard use of HTTP, whereas a persistent connection is typically established through the use of TCP/IP or through some non-standard use of HTTP. Browser-native client-side technologies include HTML and JavaScript, whereas non-browser-native client-side technologies require some type of web-browser plug-in, such as Microsoft Corporation's ActiveX, Sun Microsystems' Java Virtual Machine, Macromedia Corporation's Flash, Active State's Tcl/Tk, or Curl Corporation's Surge, just to name a few.

Typically, when transmitting data from a server to a Web page within a Microsoft Web browser, utilizing a non-persistent connection and browser-native client-side technology is superior for the following reasons:

1. Low overhead: HTTP (i.e. a non-persistent connection) closes the socket after data has been transmitted, whereas a persistent connection does not. Thus, because each open socket consumes server resources, using HTTP in a non-persistent connection manner lowers the server overhead required.
2. Broad reach: Non-browser-native client-side technology requires a Web browser plug-in to function, which usually is not included with the Web browser and requires a software download. Most users are weary of installing new software on their machines, and/or are reluctant to wait for the download to complete. Thus, a Web page that does not require a Web browser plug-in is accessible by all Internet users.
3. High performance: many of us who have experience with Java Applets and other non-browser native technology are all too familiar with the performance issues of such technologies. They are generally slow to load and run, offer inconsistent performance across various system configurations, and can even crash the Web browser and operating system. On the other hand, HTML and JavaScript are fast and stable, offering consistent performance and reliability across any computer configuration.

One disadvantage of utilizing browser-native client-side technology for downloading data is that each time a new text file or Web page is download to the browser, that action is recorded in the Web browser's history list. The Microsoft Web browser provides no means for erasing a given history record, once it has been added.

The present invention outlines a system and provides several implementations for downloading new information to a Web page through a non-persistent HTTP connection, utilizing browser-native client-side technology, and preventing the creation of a given history record.

System Configuration

FIG. 1 shows a system 100 consisting of a Microsoft browser 101, Web page 102, a data receiver 103, a non-persistent HTTP network connection 104, a Web server 105, and a data transport file 106. The Microsoft Web browser 101 utilizes the HTTP connection 104 to request the Web page 102. Meanwhile, a file exists at the Web server that contains some data, the data transport file 106, or some mechanism exists for dynamically generating its data at runtime. The Web page 102 sends a request for the data transport file 106, which is downloaded to the data receiver 103. Once the data transport file 106 is contained within the Web browser 101, its data is either displayed to the user or processed by some client-side scripting (e.g. JavaScript).

System Implementation

Because the data receiver is lacking today, it is the key stumbling block in this outlined system. Furthermore, in order for this system to be effective, the data receiver must be able to download the data transport file without adding a URL to the Web browser's history list. The data receiver can potentially be implemented by any HTML element that has a "SRC" property and can load a text file (e.g. the data transport file). Examples of these supported by the Microsoft Web browser are the HTML <script> element, the HTML <xml> element, the HTML <iframe> element, and the HTML <frame> element. Unfortunately, the subset of such HTML elements that are traditionally used to load Web pages, such as the HTML <iframe> element and the HTML <frame> element, cannot be utilized as-is. This is due to the fact that for each time a text file is downloaded to this subset of HTML elements, the URL of the text file is recorded in the Web browser's history list. Thus, further modification is necessary before we can effectively use this subset of HTML elements for the data receiver.

<script> Implementation

The outlined system can be generally implemented as follows. We will use a HTML <script> element as an example. Below you will find the source code for the Web page, client.htm, and the data transport file, datatransport.asp.

A global variable is defined in client.htm for future use. When the data transport file is delivered to the data receiver, the global variable data_holder will hold its data so it may be accessible to some JavaScript code or so it may be displayed to the user.

var data_holder;

A empty HTML <script> element, the data receiver, is defined in client.htm. The data receiver will be used by the trigger function to download the data transport file.

<script language="JavaScript" id="data_receiver" src=""></script>

A trigger function is defined in client.htm, which will assign the URL of the data transport file to the data receiver. Once this occurs, a HTTP request is sent to the Web server for the data transport file. Keep in mind that this trigger function would be called when a given event occurs, such as a button click or a timer.

```
function request_new_data( )
{
        document.scripts("data_receiver").src="data_transport.asp";
}
```

The data transport file, datatransport.asp, when requested, will invoke the server-side JavaScript and return the new data, "This is new data," to the data receiver. Keep in mind that datatransport.asp can be implemented as other server page types, such as JSP or PHP, just to name a few.

```
<script runat=server Language=JavaScript>
Response.Write("process_new_data(\"This is new data\");")
</script>
```

A callback function, process_new_data, is defined in client.htm. Once the data transport file is delivered to the data receiver, the function process_new_data will automatically execute, transferring the data contained in the data transport file to the data holder. The data holder can now be accessed by some JavaScript function to either perform some evaluation or display it to the user.

```
function process_new_data(data)
{
        data_holder=data;
}
```

The Web page and the data transport file can be easily modified so that the data returned is dynamically generated. For example, user input or other parameters can be passed to datatransport.asp, such that it can be processed by some server-side business logic, such as performing a database query and/or calculation. Specifically, you will notice changes to the trigger function contained in client.htm and changes to the server-side script in datatransport.asp.

The trigger function in client.htm will need to pass some input parameter along with the request for the data transport file.

```
function request_new_data(input)
{
        document.scripts("data_receiver").src="datatransport.asp?parameter="+input;
}
```

The server-side script in datatransport.asp will need to extract the input parameter and utilize it to perform some action. In this case, it is simply appended to the static data "This is new data with input," and returned to the data receiver.

<xml> Implementation

The outlined system can be generally implemented as follows. We will use a HTML <xml> element as an example. Below you will find the source code for the Web page, client.htm, and the data transport file, datatransport.asp.

A global variable is defined in client.htm for future use. When the data transport file is delivered to the data receiver, the global variable data_holder will hold its data so it may be accessible to some JavaScript code or so it may be displayed to the user.

var data_holder;

A trigger function is defined in client.htm, which will dynamically generate the data receiver, assigning to it the URL of the data transport file. Once this occurs, a HTTP request is sent to the Web server for the data transport file. Keep in mind that this trigger function would be called when a given event occurs, such as a button click or a timer.

```
function request_new_data( )
{
        var dynamic_xml="<div><XML SRC='datatransport.asp'id='data_receiver'
        ondataavailable='process_new_data( )'></XML><div>";
        document.body.insertAdjacentHTML("BeforeEnd",dynamic_xml);
}
```

The data transport file, datatransport.asp, when requested, will invoke the server-side JavaScript and return the XML data set containing the new data, "This is new data." Keep in mind that datatransport.asp can be implemented as other server page types, such as JSP or PHP, just to name a few. If no server-side scripting is necessary (i.e. the XML data is not dynamically generated), the XML server page type may be used.

```
<script runat=server Language=JavaScript>
Response.Write("<XML><DATA>This is new data</DATA></XML>")
</script>
```

A callback function, process_new_data, is defined in client.htm. Once the data transport file is delivered to the data receiver, the function process_new_data will automatically execute, transferring the XML data contained in the data transport file to the data holder. The data holder can now be accessed by some JavaScript function to either perform some evaluation or display it to the user.

```
<script runat=server Language=JavaScript>
var input_data=Request("parameter");
Response.Write("process_new_data(\"This is new data with input " + input_data + "\");");
</script>
```

```
function process_new_data(data)
{
         data_holder=data_receiver.XMLDocument.selectSingleNode("XML/DATA").text;
}
```

The Web page and the data transport file can be easily modified so that the data returned is dynamically generated. For example, user input or other parameters can be passed to datatransport.asp, such that it can be processed by some server-side business logic, such as performing a database query and/or calculation. Specifically, you will notice changes to the trigger function contained in client.htm and changes to the server-side script in datatransport.asp.

The trigger function in client.htm will need to pass some input parameter along with the request for the data transport file.

```
function request_new_data(input)
{
         var strURL="datatransport.asp?parameter="+input;
         var dynamic_xml="<div><XML SRC="+strURL+" id='data_receiver'
         ondataavailable='process_new_data( )'></XML></div>";
         document.body.insertAdjacentHTML("BeforeEnd",dynamic_xml);
}
```

The server-side script in datatransport.asp will need to extract the input parameter and utilize it to perform some action. In this case, it is simply appended to the static data "This is new data with input," and returned to the data receiver.

```
<script runat=server Language=JavaScript>
var input_data=Request("parameter")
Response.Write("<XML><DATA>This is new data with input"+ input_data +
"</DATA></XML>")
</script>
```

<iframe> Implementation

As mentioned before, the HTML elements that are traditionally used to load Web pages require further modification before we can effectively use them as the data receiver. Below we outline a method for utilizing a HTML <iframe> element without creating a record in the Web browser's history list. Below you will find the source code for the Web page, iframe_client.htm, and the data transport file, iframe_datatransport.asp.

A HTML <form> element is defined in iframe_client.htm, which will later be used by the data receiver to request the data transport file, iframe_datatransport.asp.

<form name="data_requester" method="get" action="iframe_datatransport.asp"></form>

A global variable is defined in iframe_client.htm for future use. When the data transport file is delivered to the data receiver, the global variable data_holder will hold its data so it may be accessible to some JavaScript code or so it may be displayed to the user.

var data_holder;

A trigger function is defined in iframe_client.htm, which prepares the data receiver and requests the data transport file. We dynamically generate a hidden HTML <iframe> element, the data receiver, without any value assigned to its "src" attribute. Because the <iframe> "src" has no value (i.e. URL) and will never be assigned a URL, the Web browser will not add a record to its history list. However, we must somehow assign the data transport file to the data receiver. This is accomplished by utilizing the HTML <form> element's "target" attribute to associate the data transport file with the data receiver. Now we submit the HTML <form> created earlier. Once this occurs, a HTTP request is sent to the Web server for the data transport file. Keep in mind that this trigger function would be called when a given event occurs, such as a button click or a timer.

```
function request_new_data( )
{
  var dynamic_iframe="<div
  id='iframe_container'><iframe style= \"visibility:hidden;\"
  name='data_receiver'></iframe></div>";
  document.body.insertAdjacentHTML("BeforeEnd", dynamic_iframe);
  document.forms.data_requester.target="data_receiver";
  document.forms.data_requester.submit( );
}
```

The data transport file, iframe_datatransport.asp, when requested, will return the HTML code and data "This is new data." Once the data receiver loads this Web page, the callback function defined in iframe_client.htm, process_new_data, will be invoked. Keep in mind that iframe_datatransport.asp can be implemented as other server page types, such as JSP or PHP, just to name a few.

```
<script runat=server Language=JavaScript>
Response.Write("<html><body
onload=parent.window.process_new_data
(\"This%20is%20new%20data\")></body></html>");
</script>
```

Once the data transport file invokes process_new_data, the data contained in the data transport file, "This is new data," is transferred to the data holder. The data holder can now be accessed by some JavaScript function to either perform some evaluation or display it to the user.

```
function process_new_data(data)
{
    data_holder=data;
}
```

The Web page and the data transport file can be easily modified so that the data returned is dynamically generated. For example, user input or other parameters can be passed to iframe_datatransport.asp, such that it can be processed by some server-side business logic, such as performing a database query and/or calculation. Specifically, you will notice changes to the HTML <form> and trigger function contained in iframe_client.htm, and changes to the server-side script in iframe_datatransport.asp.

A hidden HTML <input> element is added to the HTML <form> element in iframe_client.htm, which will later be used by the data receiver to pass some parameter to the data transport file.

```
<form name="data_requester" method="get"
    action="iframe_datatransport.asp">
    <input type="hidden" name="parameter">
</form>
```

The trigger function in iframe_client.htm will now need to also pass some input parameter along with the request for the data transport file. This occurs in the first line of the function, when the input parameter is assigned to the hidden HTML <input> element of the form being submitted.

```
function request_new_data_with_input(input)
{
    var dynamic_iframe="<div
    id='iframe_container'><iframe style= \"visibility:hidden;\"
    name='data_receiver'></iframe></div>";
    document.body.insertAdjacentHTML("BeforeEnd", dynamic_iframe);
    document.forms.data_requester.parameter.value=input;
    document.forms.data_requester.target="data_receiver";
    document.forms.data_requester.submit( );
}
```

The server-side script in iframe_datatransport.asp will need to extract the input parameter and utilize it to perform some action. In this case, it is simply appended to the static data "This is new data with input," and returned to the data receiver.

```
<script runat=server Language=JavaScript>
var input_data=Request("parameter")
Response.Write("<html><body
onload=parent.window.process_new_data
(\"This%20is%20new%20data%20with%20input%20"+
input_data+"\")></body></html>");
</script>
```

The present invention has been described above in terms of presently preferred embodiments so that an understanding of the present invention can be conveyed. There are, however, many configurations for network data delivery not specifically described herein, but with which the present invention is applicable. The present invention should therefore not be seen as limited to the particular embodiments described herein, but rather, it should be understood that the present invention has wide applicability with respect to network data delivery generally. All modifications, variations, or equivalent arrangements and implementations that are within the scope of the attached claims should therefore be considered within the scope of the invention.

We claim:

1. A method for bringing new data to a Web page displayed in Microsoft Web browser window at a client device, the method comprising:

displaying, in Microsoft Web browser window of a client device, a Web page, wherein said Web page no longer has any active HTTP connections;

transmitting, to a server, an HTTP request; and receiving, from said server, an HTTP response associated with said HTTP request, wherein the transmitting and receiving actions do not utilize Web browser plug-in, Java Applet, or ActiveX technology, and do not add a Universal Resource Locator (URL) to said application's history list.

2. A method as defined in claim 1, wherein information in said HTTP response is delivered to an HTML element of a Web page that is capable of loading a text file.

3. A method as defined in claim 2, wherein information in said HTTP response is delivered to an HTML <script> element of a Web page.

4. A method as defined in claim 3, wherein information in said HTTP response contains only one JavaScript instruction or line of JavaScript code.

5. A method as defined in claim 4, wherein said JavaScript instruction automatically executes a JavaScript function defined in said Web page.

6. A method as defined in claim 2, wherein information in said HTTP response is delivered to an HTML <iframe> element of a Web page.

7. A method as defined in claim 2, wherein information in said HTTP response is delivered to an HTML <xml> element of a Web page.

8. A method as defined in claims 3, 6, or 7, wherein said information from said HTTP response is displayed on said Web page.

9. A method as defined in claims 3, 6, or 7, wherein said information from said HTTP response is processed by program code of a Web page.

* * * * *